(12) United States Patent
Wiman et al.

(10) Patent No.: US 7,578,639 B2
(45) Date of Patent: *Aug. 25, 2009

(54) TOOL FOR CHIP-REMOVING MACHINING

(75) Inventors: Jörgen Wiman, Sandviken (SE); Kjell Englund, Valbo (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 11/902,419

(22) Filed: Sep. 21, 2007

(65) Prior Publication Data

US 2008/0056831 A1 Mar. 6, 2008

Related U.S. Application Data

(63) Continuation of application No. 10/994,647, filed on Nov. 23, 2004, now Pat. No. 7,300,232.

(30) Foreign Application Priority Data

Nov. 25, 2003 (SE) .................................... 0303121

(51) Int. Cl.
*B23B 29/12* (2006.01)
*B23B 27/22* (2006.01)

(52) U.S. Cl. ........................ 407/101; 407/103; 407/107

(58) Field of Classification Search ................. 407/101, 407/103, 107, 46, 109–111, 113–117, 48, 407/40, 53, 33, 34, 64

See application file for complete search history.

(56) References Cited

U.S. PATENT DOCUMENTS 3,629,919 A * 12/1971 Trevarrow, Jr. .............. 407/103

(Continued)

FOREIGN PATENT DOCUMENTS

DE 37 14 14055 11/1987

(Continued)

*Primary Examiner*—Willmon Fridie
(74) *Attorney, Agent, or Firm*—Drinker Biddle & Reath LLP (57) ABSTRACT

A tool for chip-removing machining includes a holder on which in indexible cutting insert is mounted. The holder includes a first base surface on which a plurality of male parts are disposed to define an insert seat. The insert includes generally parallel second and third base surfaces, each having a plurality of female parts disposed therein. The insert is invertible such that the female parts of one of the second and third base surfaces receive respective male parts of the holder. A fastener secures the insert on the seat, with the male parts tightly fitted in the female parts. The male parts are flexible relative to the first base surface to ensure a firm abutment of the male parts with surfaces of respective female parts.

16 Claims, 6 Drawing Sheets

U.S. PATENT DOCUMENTS

| | | | |
|---|---|---|---|
| 3,781,956 A | 1/1974 | Jones et al. | |
| 4,685,844 A | 8/1987 | McCreery et al. | |
| 5,139,371 A * | 8/1992 | Kraft et al. | 407/101 |
| 5,810,518 A | 9/1998 | Wiman et al. | |
| 5,888,029 A | 3/1999 | Boianjiu | |
| 5,924,826 A | 7/1999 | Byström et al. | |
| 6,146,061 A | 11/2000 | Larsson | |
| 6,343,898 B1 | 2/2002 | Sjöö et al. | |
| 6,601,486 B2 | 8/2003 | Hansson et al. | |
| 6,626,614 B2 | 9/2003 | Nakamura | |
| 6,736,574 B2 | 5/2004 | Persson et al. | |
| 2004/0028486 A1 | 2/2004 | Englund | |

FOREIGN PATENT DOCUMENTS

| | | |
|---|---|---|
| DE | 198 47 227 | 4/2000 |
| JP | 2003-340612 | 12/2003 |

* cited by examiner

TOOL FOR CHIP-REMOVING MACHINING

This is a continuation application of application Ser. No. 10/994,647, filed on Nov. 23, 2004, now U.S. Pat. No. 7,300,232, which is incorporated herein by reference in the entirety.

TECHNICAL FIELD OF THE INVENTION

The present invention relates to a tool for chip-removing machining, the tool comprising an insert holder, a cutting insert for chip-removing machining, the cutting insert being indexable and invertible (turnable), as well as means for fixing the cutting insert in an insert seat of the insert holder.

PRIOR ART

Such a tool for chip-removing machining is previously known from SE-A-0201573-3 corresponding to U.S. Published Application 2004/0028486. In this connection, on the bottom side thereof the cutting insert is provided with a protruding male part, which is intended to cooperate with flexible portions of a female part in the insert seat. By the fact that the cutting insert has a male part on the bottom side thereof, the cutting insert is not turnable.

A tool coupling is previously known from WO 01/87523-A1, corresponding to U.S. Pat. No. 6,601,486, disclosing a tool for chip-removing machining which includes a cutting insert for chip-removing machining and an insert holder. The cutting insert for chip-removing machining has on the bottom side thereof a male part and the insert holder has a female part corresponding to the male part. The male part comprises a number of teeth having both axial and radial extensions. The female part comprises a number of recesses, which are designed to receive the teeth of the male part. In general, both the male part and the female part may be conical.

OBJECTS AND FEATURES OF THE INVENTION

A primary object of the present invention is to provide a tool of the general kind defined above, as well as the cutting insert and the insert holder included in the tool, whereby the fixation of the cutting insert in the insert holder should be extraordinarily stable at the same time as the cutting insert is turnable. In this connection, it is particularly important that the cutting insert can withstand forces which are changeable and acting from different directions and that the fixation is not materially affected by shifting temperatures that may occur during true working conditions.

Another object of the present invention is to use such materials in the insert holder and the cutting insert that the properties of the materials are optimally utilized.

At least the primary object of the present invention is realized by a tool for chip-removing machining which comprises a holder, an indexable cutting insert, and a fastener. The holder includes a body having a first base surface on which a plurality of male parts are disposed to define an insert seat. The cutting insert is mounted on the seat and includes generally parallel second and third base surfaces each having a plurality of female parts disposed therein. The insert is invertable such that the female parts of one of the second and third base surfaces tightly receive respective male parts of the holder. The fastener secures the insert on the seat, with the male parts tightly fitted in the female parts. The male parts are flexible relative to the first base surface to ensure a firm abutment of the male parts with surfaces of the respective female parts.

The invention also pertains to an indexable and invertable cutting insert for chip-removing machining. The insert comprises a body having substantially parallel base surfaces adapted for alternately engaging a seat when the insert is inverted. Each base surface includes a plurality of female connecting parts.

The invention also pertains to an insert holder which comprises a base surface having male parts projecting therefrom to form an insert seat. Each male part is flexible relative to the base surface.

BRIEF DESCRIPTION OF THE DRAWINGS

Below, a number of embodiments of the invention will be described, reference being made to the appended drawings, where.

DETAILED DESCRIPTION OF PREFERRED EMBODIMENTS OF THE INVENTION

Figure 1:
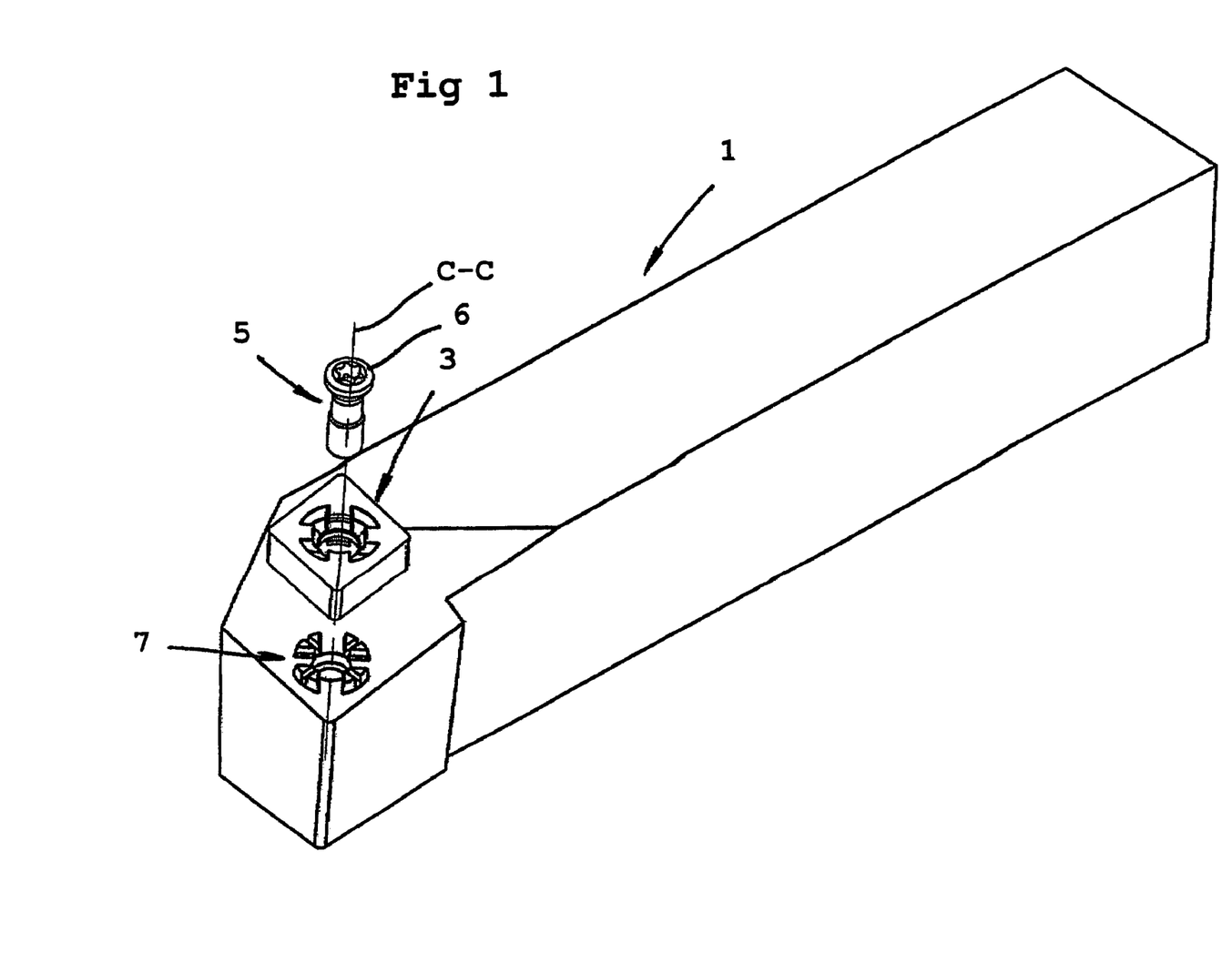
FIG. 1 shows an exploded view in perspective of a tool according to the present invention

In FIG. 1, an exploded view of a tool according to the present invention is shown. Thus, the tool comprises an insert holder 1, a cutting insert 3 for chip-removing machining, and means for fixation, in the form of a locking screw 5, in order to fix the cutting insert 3 in an insert seat 7 of the insert holder 1. The locking screw 5 has a conical head 6. A common center axis for the locking screw 5, the cutting insert 3 and the insert seat 7 is designated C-C in FIG. 1.

Figure 2:
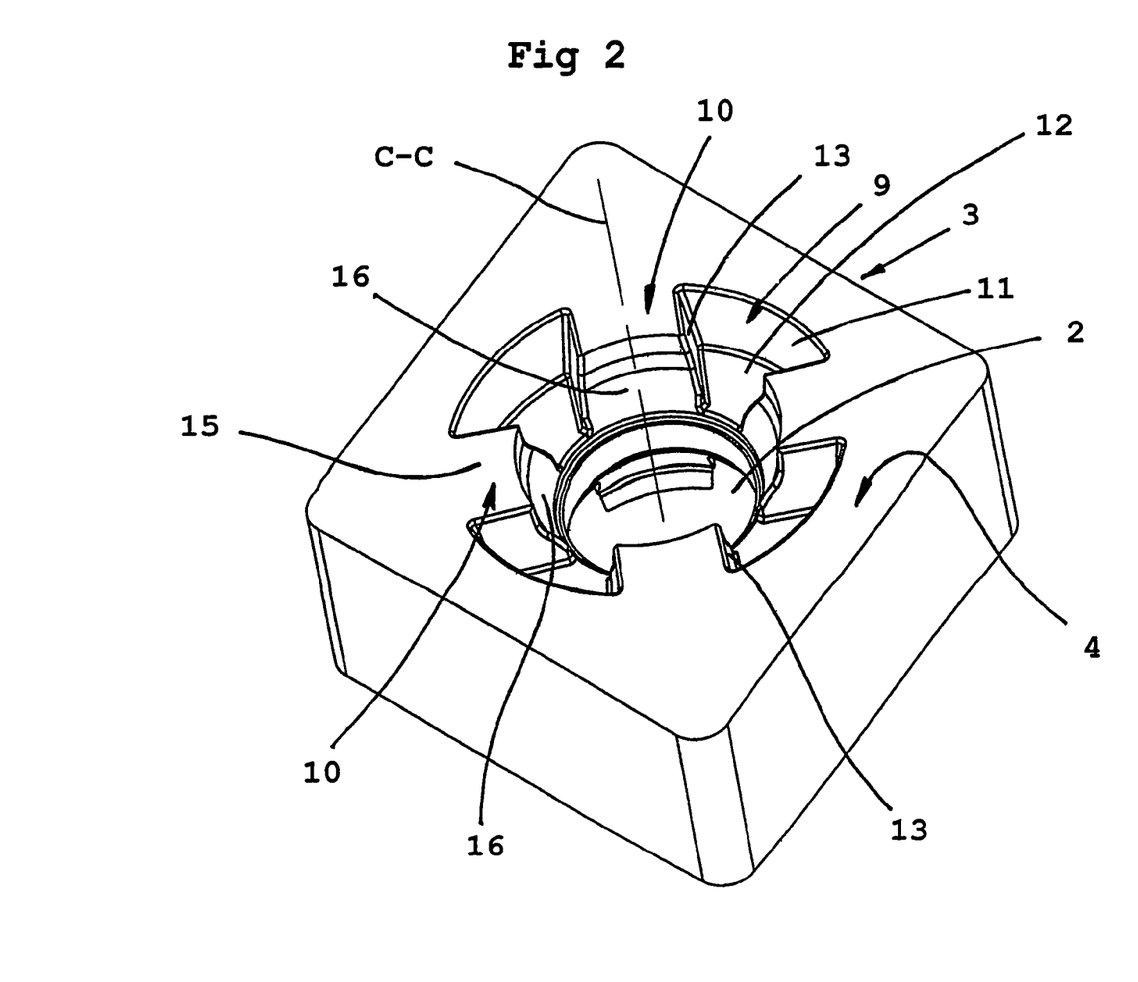
FIG. 2 shows a perspective view obliquely from above of a cutting insert included in the tool according to the present invention

As may be most clearly seen in FIG. 2, the cutting insert 3 for chip—removing machining has two identical base surfaces 4, only one of which is visible in FIG. 2. The base surfaces 4 are parallel with each other. The cutting insert 3 also has a through-going first center hole 2 for receipt of the locking screw 5. The cutting insert 3 is provided with four female connecting parts in the form of identical recesses 9 in each base surface 4 thereof as can be seen in FIG. 2. Each one of the recesses 9 generally has the shape of a truncated triangle. Between the recesses 9, first protrusions 10 are formed, which also are four in number. The first protrusions 10 are identical.

Each one of the recesses 9 is defined by a first, curved circumferential surface 11, which constitutes the part of the recesses 9 that is situated farthest away from the center of the cutting insert 3. Each one of the recesses 9 is further defined by a bottom surface 12, which is generally parallel with the base surface 4 of the cutting insert 3. Each one of the recesses 9 is further defined by two side surfaces 13, which generally have a radial extension toward the center axis C-C of the cutting insert 3. Each one of the first protrusions 10 defines a generally rectangular surface 15, which constitutes a part of the respective base surface 4 of the cutting insert 3. Furthermore, each one of the first protrusions 10 defines a front surface 12 facing the center of the cutting insert 3, which front surface generally slopes away from the center of the cutting insert 3 in the direction toward the respective base surface 4 of the cutting insert 3. The side surfaces 13 included in the recesses 9 are common to the recesses 9 and the first protrusions 10, i.e., the side surfaces 13 constitute bordering surfaces also to the first protrusions 10. The two side surfaces 13 that belong to one and the same first protrusion 10 converge slightly toward each other in a direction toward the respective base surface 4 and also converge generally towards the center of the cutting insert 3. By the fact that both the recesses 9 and the first protrusions 10 are identical, the cutting insert 3 is indexable, i.e., it may be brought to assume four different positions when one and the same base surface 4 abuts against the insert seat 7

The cutting insert 3 is of a negative basic shape and it has a second base surface, which is hidden in FIG. 2. Said second base surface has an identical design as the shown base surface 4 regarding the recesses 9 arid the first protrusions 10. This means that the cutting insert 3, in addition to being indexable, furthermore is invertible, i.e., either of the base surfaces 4 may be brought to abutment against the insert seat 7 of the insert holder 1.

Figure 3:
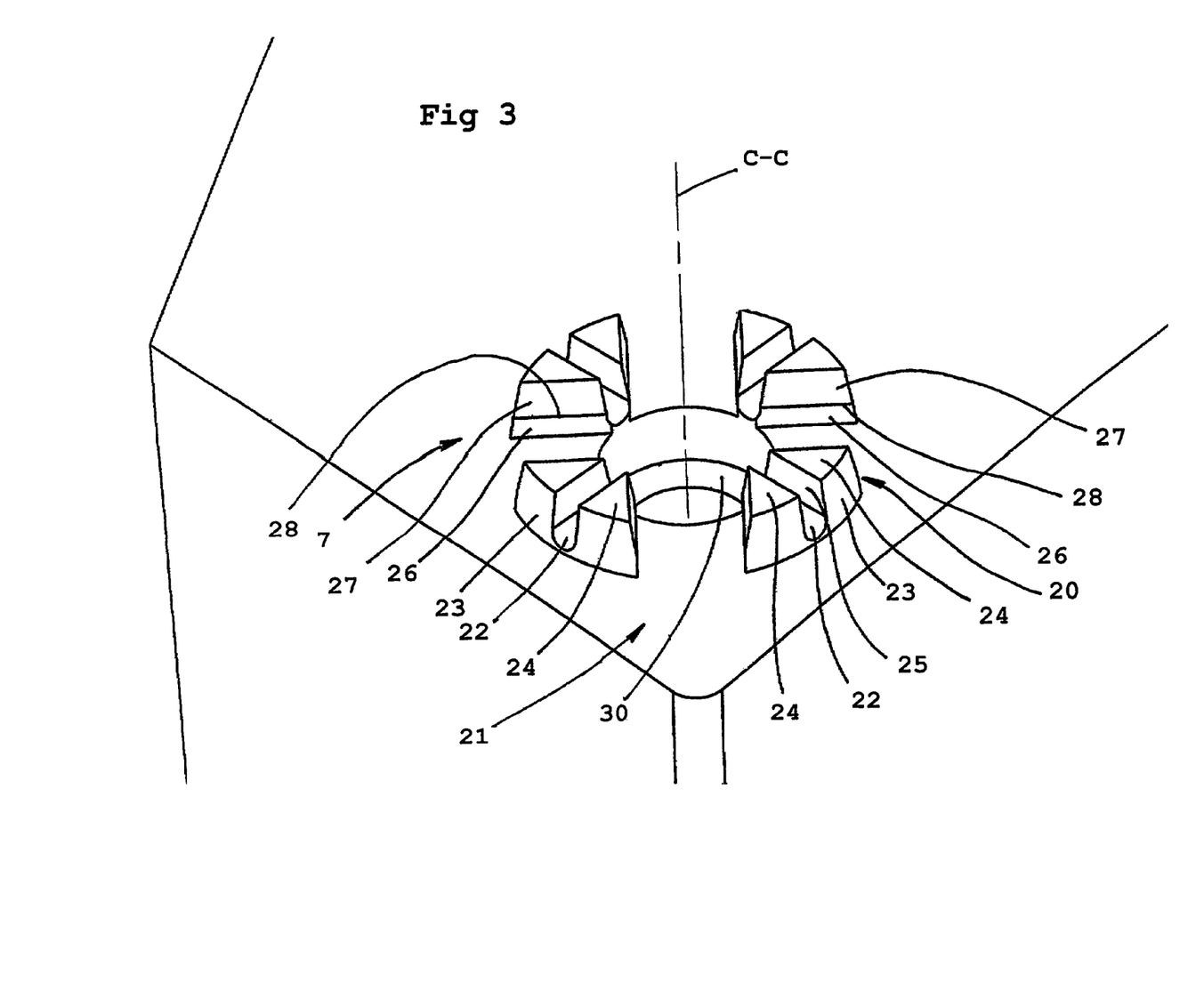
FIG. 3 shows in detail, in a perspective view obliquely from above, an insert seat of an insert holder included in the tool

The insert seat 7 shown in detail in FIG. 3 comprises a number of second protrusions 20, which generally project from an abutment surface 21 of the insert holder 1. The second protrusions 20 generally have a triangular shape tapering in a direction inwards towards the center axis C-C of the insert seat 7. Each one of the second protrusions 20 is provided with a slot 22, which has an axial extension along a greater part of the height of the second protrusion 20 and a radial extension along the entire radial extension of the second protrusion 20. The slot 22 divides the second protrusion 20 into two equally great parts. The function of the slot 22 will be described below.

Each one of the second protrusions 20 is defined by a second, curved circumferential surface 23, which constitutes the part of the second protrusions 20 that is situated farthest away from the center axis C-C of the insert seat 7. The second, curved circumferential surface 23 is intersected by the appurtenant slot 22. Each one of the second protrusions 20 is also defined by two upper surfaces 24, which generally are of a triangular shape and are parallel with the abutment surface 21 of the insert seat 7. Each one of the second protrusions 20 is also defined by two internal side surfaces 25, which generally are planar and located in the slot 22. Each one of the second protrusions 20 has two external side surfaces that converge toward the center axis C-C. Each external side surface is defined by first and second side surface portions side 26 and 27, said side surface portions 26 and 27 being spaced apart by a dividing line 28 which extends parallel to the abutment surface 21 of the insert seat 7. The two first side surface portions 26 of each protrusion 20 extend perpendicular to the abutment surface 21 while the second respective side surface portions 27 of each protrusion 20 converge towards each other in a direction toward the respective upper surface 24.

The insert seat 7 is also provided with an internally threaded second hole 30, which is intended to receive the externally threaded portion of the locking screw 5.

Upon mounting of the cutting insert 3 on the insert holder 1, the second protrusions 20 of the insert seat 7 are caused to be received in respective recesses 9 of the cutting insert 3. In this connection, the second side surface portions 27 of the second protrusions 20 will abut tightly against respective side surfaces 13 of the cutting insert 3. Therefore, it is suitable that the second side surface portions 27 and the side surfaces 13 have a corresponding inclination in relation to a common reference plane. This means that the second side surface portions 27 and the side surfaces 13 should be parallel with each other when the cutting insert 3 is mounted on the insert holder 1. When the cutting insert 3 is correctly mounted on the insert holder 1, a base surface 4 of the cutting insert 3 abuts against the abutment surface 21 of the insert seat 7. This correct mounting position is attained by virtue of the screw 5 being introduced into the center hole 2 of the cutting insert 3, the external threaded portion of the screw 5 being brought into engagement with the internally threaded second hole 30 of the insert seat 7. In this connection, the conical head 6 of the screw 5 will cooperate with the front surfaces 16 of the first protrusions 10, whereby a base surface 4' of the cutting insert 3 is brought to a satisfactory abutment against the abutment surface 21 of the insert seat 7.

As has been mentioned above, an abutment also takes place between the second side surface portions 27 of the second protrusions 20 and the side surfaces 13 of the cutting insert 3. In this connection, due to the fact that the side surface portions 27 of each projection 20 converge away from the abutment surface 21, the second protrusions 20 will apply counter-directed forces to the two side surfaces 13 of a first protrusion 10 of the cutting insert 3, which generate compressive stresses in the first protrusions 10 of the cutting insert 3. This is exceptionally important when the cutting insert 3, and thereby also the first protrusions 10, are made from cemented carbide or similar hard materials that generally cannot carry tensile stresses.

Studying FIG. 3, it is realized that the slot 22 arranged in each second protrusion 20 ensures that the second protrusion 20 is endowed with a certain flexibility, i.e., the part protrusions of each second protrusion can be mutually displaced somewhat in relation to each other when the cutting insert 3 is being mounted on the insert holder 1. The mutual displacement of the part protrusions relative to each other thereby generally takes place in a direction that is parallel with the abutment surface 21 of the insert seat 7. This flexibility of the second protrusions 20 ensures that a substantially satisfactory abutment is obtained between the side surfaces 13 and the second part side surfaces 27. Thereby, an extraordinarily stable clamping of the cutting insert 3 on the insert holder 1 is obtained.

In the first alternative embodiment (shown in FIG. 4) of an insert seat 107 of an insert holder 102 that is included in a tool according to the present invention, the insert seat 107 comprises four second protrusions 120, which are identical and arranged symmetrically around an internally threaded second center hole 130 of the insert seat 107. Each one of the second protrusions 120 is defined by a second, curved circumferential surface 123, which constitutes the part of the second protrusions 120 that is situated farthest away from the center axis C-C of the insert seat 107. Each one of the second protrusions 120 is also defined by an upper surface 124, which is of a generally triangular shape and parallel with the abutment surface 121 of the insert seat 107. Each one of the second protrusions 120 is also defined by two external side surfaces 127, which generally have a radial extension. The side surfaces 127 slightly converge towards each other in the direction toward the upper surface 124 of the respective second protrusions 120.

Figure 4:
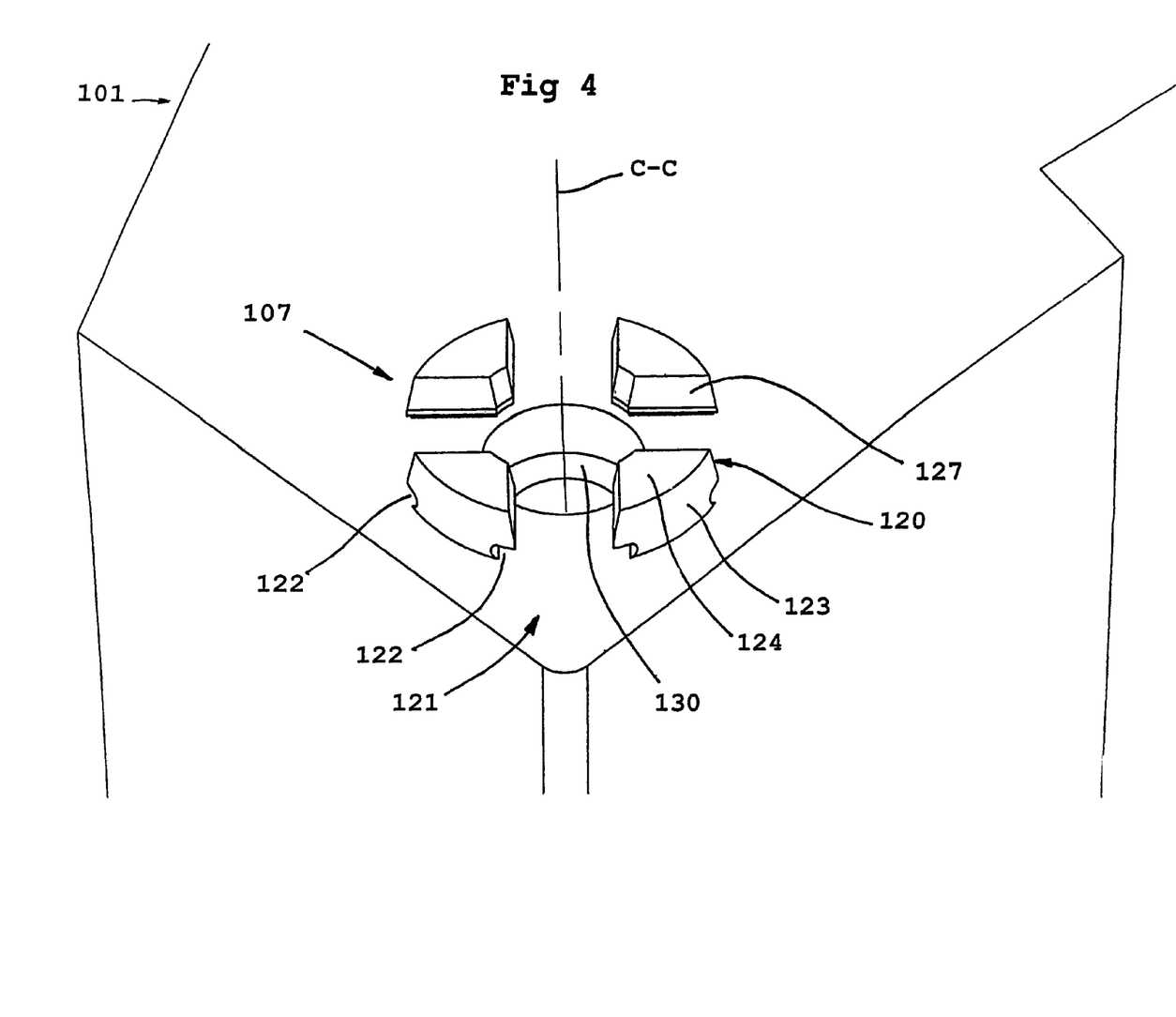
FIG. 4 shows in detail, in a perspective view obliquely from above, an alternative insert seat of an insert holder included in the tool

As may be most clearly seen from the two second protrusions 120 in FIG. 4 positioned closest to the observer, each one of the second protrusions 120 is provided with notches (undercuts) 122 in the area of connection between the second protrusions 120 and the abutment surface 121 and more precisely in the area of the connection of the side surfaces 127 to the abutment surface 121 of the insert seat 107, i.e., each second protrusion 120 has two notches 122. The provision of the notches 122 imparts to the second protrusions 120 certain flexibility, whereby a marginal downward deflection of the protrusions 120 is enabled adjacent to the side surfaces 127. The deflection generally takes place in a direction that is perpendicular to the abutment surface 121 of the insert seat 107. The flexibility is favorable as for the cooperation of the side surfaces 127 with the associated surfaces of the cutting insert (not shown) that shall be clamped in the insert seat 107. The cutting insert (not shown) has, correspondingly to the cutting insert 3 above, recesses and first protrusions, which are formed for an optimum cooperation with the second protrusions 120.

Figure 5:
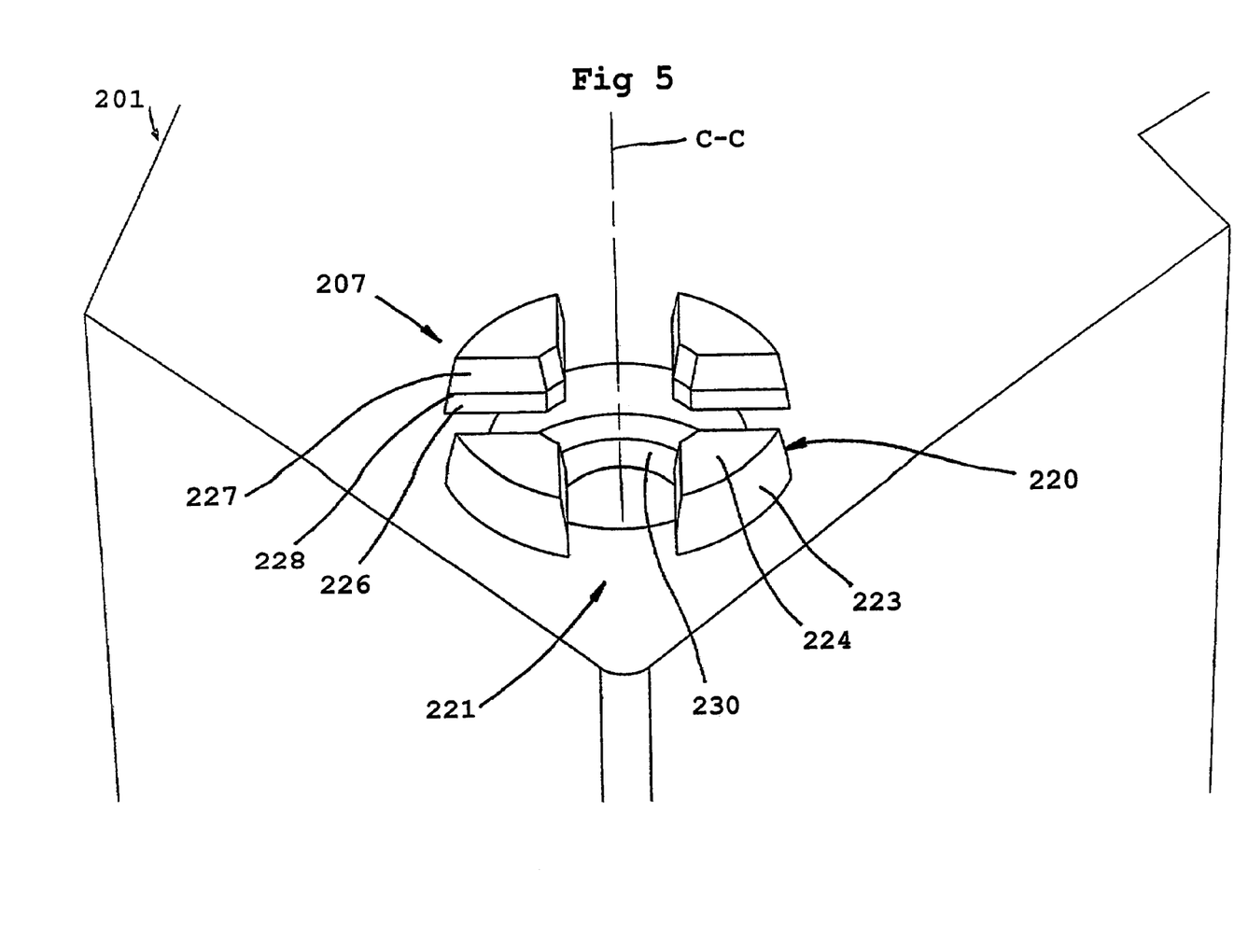
FIG. 5 shows in detail, in a perspective view obliquely from above, an additional alternative insert seat of an insert holder included in the tool

In FIG. 5, a second alternative embodiment of an insert seat 207 of an insert holder 201 included in a tool according to the present invention is shown. The insert seat 207 comprises four second protrusions 220, which are identical and arranged symmetrically around an internally threaded center hole 230 of the insert seat 207. Each one of the second protrusions 220 is defined by a second, curved circumferential—surface 223, which constitutes the part of the second protrusions 220 that is situated farthest away from the center axis C-C of the insert seat 207. Each one of the second protrusions 220 is also defined by an upper surface 224, which is of a generally triangular shape and parallel with the abutment surface 221 of the insert seat 207. Each one of the second protrusions 220 is also defined by two external first and second side surface portions 226 and 227 which are spaced apart by a dividing line 228 that extends parallel with the abutment surface 221 of the insert seat 207. The first side surface portions 226 of each protrusion 220 have an extension perpendicular to the abutment surface 221, while the second side surface portions 227 slightly converge towards each other in a direction toward the upper surface 224 of the respective second protrusion 220. As is seen in FIG. 5, the parts of the second protrusions 220 located closest to the center axis C-C of the insert seat 207 extend a distance across the center hole 230, but not far enough to interfere with the locking screw 5. This means that a part radially inner of each one of the second protrusions 220 does not have any subjacent support, which ensures that the second protrusions 220 exhibit a certain flexibility. In this connection, a marginal downward deflection of the inner parts of the second protrusions 220 located closest to the center axis C-C is allowed, the deflection generally taking place in a direction perpendicular to the abutment surface 221 of the insert seat 207. The flexibility means that the second side surface portions 227 will abut firmly against the first protrusions of a cutting insert (not shown) that is received in the insert seat 207, to create a stable clamping of the insert.

Figure 6:
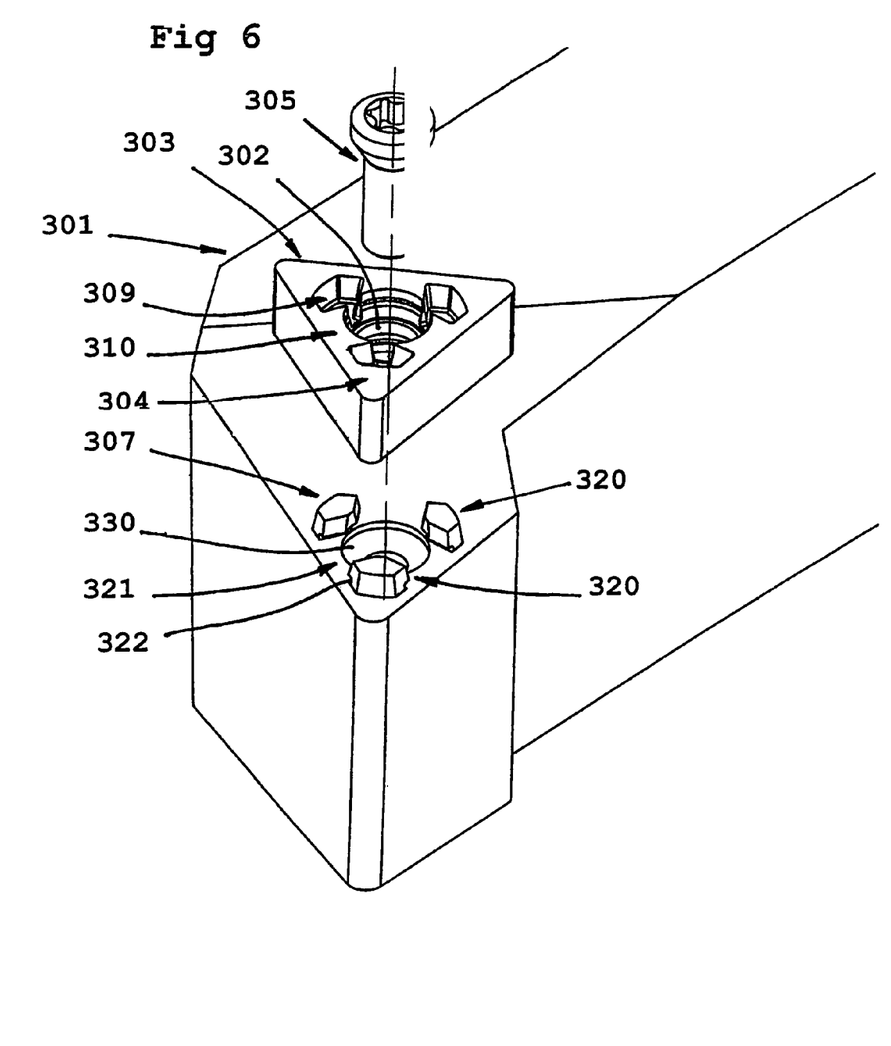
FIG. 6 shows an exploded view in perspective of an alternative embodiment of a tool according to the present invention.

In FIG. 6, an exploded view is shown of an alternative tool according to the present invention. Thus, the tool comprises an insert holder 301, a cutting insert 303 for chip-removing machining, and fixing means, in the form of a locking screw 305, for fixing the cutting insert 303 in an insert seat 307 of the insert holder 301. The locking screw 305 has a conical head 306. A common center axis for the locking screw 305, the cutting insert 303 and the insert seat 307 is designated C-C in FIG. 1. The principal difference in comparison to the tool according to FIG. 1 is that the cutting insert 303 is of a triangular basic shape and that the insert seat 301 is formed for adaptation to the same triangular basic shape.

The recesses 309 of the cutting insert 303 are three in number and are defined by a plurality of side surfaces. Generally, the recesses 309 have a somewhat widening shape in the direction toward a respective (adjacent) base surface 304 of the cutting insert 303. Between the recesses 309, first protrusions 310 are formed. The insert seat according to FIG. 6 comprises three second protrusions 320, which have a design that principally resembles the second protrusions 120 in FIG. 4, especially concerning the fact that the second protrusions 320 have notches 322 that correspond to the notches 122 of the second protrusions 120. The second protrusions 320 are defined by a plurality of side surfaces and the second protrusions 320 generally have a somewhat tapering shape in the direction from an abutment surface 321 of the insert seat 307. In a corresponding way as for the second protrusions 120, the notches 322 impart certain flexibility to the second protrusions 320, said flexibility aiding in the abutting co-operation with the recesses 309 of the cutting insert 303. In the above-described embodiments, it has been indicated that the cutting insert 3; 303 is provided with a number of recesses 9; 309. which may be called "female parts," and those recesses may have a variety of different designs.

In the above-described embodiments, it has been indicated that the insert seat 7; 107; 207; 307 is provided with a number of second protrusions 20; 120; 220; 320 which may be called "male parts," and those second protrusions may have a variety of different designs.

FEASIBLE MODIFICATIONS OF THE INVENTION

In the above-described embodiments, a number of examples have been given of constructive designs in order to impart the second protrusions 20; 120; 220; 320 certain flexibility. However, within the scope of the present invention, it is feasible to conceive additional constructive designs that ensure that the surfaces of the protrusions 20; 120; 220; 320 that should co-operate with the recesses 9; 309 of the cutting inserts 3; 303 are somewhat resilient. In the above-described embodiments, the cutting insert 3; 303 is fixed by means of a locking screw 5; 305 that extends through a center hole 2; 302 of the cutting insert 3; 303. However, within the scope of the present invention, it is also feasible for the cutting insert to be fixed to the holder in an alternative way, wherein with an exemplifying and not limiting purpose, a top clamp may be mentioned which bears against the insert.

In the above-described embodiments, the tool comprises cutting inserts that generally are intended for external turning, the cutting edges of the cutting insert 3; 303 generally having an extension parallel to the abutment surface 21 322 of the insert seat 7 307. However, within the scope of the present invention, it is also feasible to conceive that the insert holder carries a cutting insert for internal turning, whereby in such a case the cutting edge generally has an extension transverse to the abutment surface of the insert seat.

In the above-described embodiments, the recesses 9; 309 of the cutting insert 3; 303 are mutually identical, and the second protrusions 20; 120; 220; 320 of the insert holder 1; 101; 201; 301 are mutually identical. However, the recesses and the second protrusions need not be identical within the scope of the present invention. If, for instance, a so-called copying insert (copy turning insert) is concerned that is indexible in only two positions, only the diametrically arranged protrusions need to be identical.

In the above-described embodiments, all second protrusions 20; 120; 220; 320 are provided with identical means that impart to the second protrusions 20; 120; 220; 320 certain flexibility. However, within the scope of the present invention it is not necessary that all second protrusions included in an insert seat are provided with identical means to bring about flexibility of the second protrusions. It is also possible to combine different types of means to bring about flexibility of the second protrusions included in an insert seat. Thus, one second protrusion may, for instance, be provided with a radial slot while another second protrusion is provided with notches adjacent to the abutment surface. The two other second protrusions may lack means that bring about flexibility.

In the above-described embodiments, the bottom surface 12 is generally parallel with the base surface 4 of the cutting insert, and the upper surfaces 24; 124; 224 are generally parallel with the abutment surface 21; 121; 221; 321 of the insert seat 7; 107; 207; 307. However, within the scope of the present invention, it is also feasible to conceive that said surfaces slope inwardly in a direction towards the center axis C-C.

What is claimed is:

1. A tool for chip-removing machining comprising:
    a holder including a body having a first base surface on which a plurality of male parts are disposed to define an insert seat, each male part defining a projection having a pair of opposing side surfaces that project away from the first base surface;
    an indexible cutting insert mounted on the seat, the insert including generally parallel second and third base surfaces each having a plurality of female parts disposed therein, each female part defining a recess having a pair of opposing side surfaces that extend into the respective second and third base surfaces, the insert being invertable such that the female parts of one of the second and third base surfaces receive respective male parts of the holder; and
    a fastener for securing the insert on the seat, with the male parts tightly fitted in the female parts;
    wherein the male parts are flexible relative to the first base surface such that the opposing side surfaces of each male part exert compressive forces on the respective opposing side surfaces of the respective female parts to ensure a firm abutment of the male parts with the respective female parts.

2. The tool according to claim 1, wherein the male parts and the female parts in each of the first, second and third base surfaces are spaced around a common center axis extending centrally through the first, second and third base surfaces.

3. The tool according to claim 1, wherein the number of female parts in each of the second and third base surfaces equals the number of male parts.

4. The tool according to claim 1, wherein the fastener comprises a locking screw extending through a center hole of the insert and threadedly secured in a threaded hole of the holder.

5. The tool according to claim 4, wherein the male parts are spaced around the threaded hole.

6. The tool according to claim 5, wherein a radially inner portion of at least one male part extends partially across the threaded hole.

7. The tool according to claim 1, wherein the male and female parts are of generally frustoconical shape.

8. The tool according to claim 1, wherein the opposing side surfaces of each male part being convergent in a direction away from the first base surface.

9. An indexible and invertible cutting insert for chip-removing machining, comprising:
    a body having substantially parallel base surfaces adapted for alternately engaging a seat when the insert is inverted; each base surface including a plurality of female parts disposed therein, each female part defining a recess having a pair of opposing side surfaces that extend into the respective base surfaces, the female parts receive corresponding flexible male parts of a holder, each male part being spaced around a hole of the holder and defining a projection extending partially across the hole and having a pair of opposing side surfaces that project away from a base surface of the holder, the male parts being flexible relative to the base surface of the holder such that the opposing side surfaces of each male part exert compressive forces on respective opposing side surfaces of the respective female parts.

10. The cutting insert according to claim 9, wherein the female parts defining protrusions between one another.

11. The cutting insert according to claim 9, wherein the female parts are spaced around a center axis of the insert, the axis passing through both base surfaces.

12. The cutting insert according to claim 11, wherein the insert includes a through hole extending along the axis.

13. The cutting insert according to claim 9, wherein the female parts widen in a direction toward the respective base surface.

14. An insert holder comprising:
    a base surface having male parts projecting therefrom to form an insert seat, each male part being spaced around a hole and defining a projection extending partially across the hole and having a pair of opposing side surfaces that project away from the base surface, each male part being flexible relative to the base surface of the holder such that the opposing side surfaces of each male part exert compressive forces on respective opposing side surfaces of respective female parts formed in an insert, each female part defining a recess having a pair of opposing side surfaces that extend into the insert.

15. The holder according to claim 14, wherein the male parts are spaced around an axis passing through the base surface.

16. The holder according to claim 15, the hole extending through the base surface along the axis.

* * * * *